(12) United States Patent
Bishwas

(10) Patent No.: US 12,442,096 B2
(45) Date of Patent: Oct. 14, 2025

(54) METHOD OF COMPRESSING CARBON DIOXIDE USING HIGH-PRESSURE ELECTROLYSIS

(71) Applicant: Hymeth ApS, Søborg (DK)

(72) Inventor: Sumon Bishwas, Brøndby Strand (DK)

(73) Assignee: Hymeth ApS, Søborg (DK)

( * ) Notice: Subject to any disclaimer, the term of this patent is extended or adjusted under 35 U.S.C. 154(b) by 580 days.

(21) Appl. No.: 17/906,634

(22) PCT Filed: Mar. 16, 2021

(86) PCT No.: PCT/EP2021/056682
§ 371 (c)(1),
(2) Date: Sep. 19, 2022

(87) PCT Pub. No.: WO2021/185836
PCT Pub. Date: Sep. 23, 2021

(65) Prior Publication Data
US 2023/0136154 A1     May 4, 2023

(30) Foreign Application Priority Data
Mar. 17, 2020   (EP) ..................... 20163771

(51) Int. Cl.
| C25B 15/08 | (2006.01) |
| C07C 1/12 | (2006.01) |
| C25B 1/02 | (2006.01) |
| C25B 1/04 | (2021.01) |
| C25B 9/05 | (2021.01) |
| F04B 9/129 | (2006.01) |

(52) U.S. Cl.
CPC .............. *C25B 15/081* (2021.01); *C07C 1/12* (2013.01); *C25B 1/02* (2013.01); *C25B 1/04* (2013.01); *C25B 9/05* (2021.01); *F04B 9/129* (2013.01)

(58) Field of Classification Search
CPC .. C07C 1/12; C07C 31/04; C25B 1/02; C25B 1/04; C10G 2/50; C10L 3/08; F04B 23/06; F04B 9/129
See application file for complete search history.

(56) References Cited

U.S. PATENT DOCUMENTS

| 3,852,180 A | 12/1974 | Gregory |
| 5,711,770 A | 1/1998 | Malina |
| 2019/0210872 A1 | 7/2019 | Lewis |

FOREIGN PATENT DOCUMENTS

| CN | 101638792 A | 2/2010 |
| CN | 104271807 A | 1/2015 |
| DE | 102013102969 A1 | 9/2014 |

(Continued)

OTHER PUBLICATIONS

Extended European Search Report; Application No. 20163771.7; Completed: Sep. 4, 2020; Issued: Sep. 18, 2020; 6 Pages.

(Continued)

*Primary Examiner* — Jafar F Parsa
(74) *Attorney, Agent, or Firm* — Whitmyer IP Group LLC

(57) ABSTRACT

A method of compressing carbon dioxide, CO2, including a) generating a stream of high-pressure oxygen gas and a stream of high-pressure hydrogen gas using a high-pressure electrolyser, b) feeding a reciprocating positive displacement pump comprising a reciprocating member, with a stream of CO2, and with the stream of high-pressure oxygen gas as drive gas to actuate the reciprocating member and compress the CO2 to obtain a stream of high-pressure CO2.

15 Claims, 2 Drawing Sheets

(56) References Cited

FOREIGN PATENT DOCUMENTS

| | | |
|---|---|---|
| DE | 102016208938 A1 | 4/2017 |
| GB | 2553758 A | 3/2018 |
| KR | 1020140016049 A | 2/2014 |
| WO | 2014016815 A2 | 1/2014 |
| WO | 2014016815 A3 | 7/2014 |
| WO | 2015059507 A1 | 4/2015 |
| WO | 2019057764 A1 | 3/2019 |

OTHER PUBLICATIONS

International Search Report and Written Opinion of the International Searching Authority; Application No. PCT/EP2021/056682; Completed: May 25, 2021; Mailing Date: Jun. 4, 2021; 11 Pages.
International Preliminary Report on Patentability and Written Opinion of the International Searching Authority; Application No. PCT/EP2021/056682; Completed: Sep. 20, 2022; 6 Pages.
Chinese Office Action; Application No. 202180022120.X; Completed: Feb. 24, 2025; Issued: Mar. 1, 2025; 17 Pages.

METHOD OF COMPRESSING CARBON DIOXIDE USING HIGH-PRESSURE ELECTROLYSIS

TECHNICAL FIELD

The present disclosure generally relates to electrolysis.

BACKGROUND

Water electrolysis is the process of converting water to hydrogen gas and oxygen gas by means of electricity. The hydrogen gas thus obtained can be reacted with carbon to obtain methane gas. WO2019/057764 discloses a system of this type. It is also known to use carbon dioxide to mix with the hydrogen gas, as disclosed in US2019/0210872.

SUMMARY

It is desirable to react hydrogen gas and carbon dioxide under high pressure to make the reaction more efficient when creating methane gas. Up to 98% efficiency can be obtained in case the reaction is carried out at high pressure and heat.

Due to the increased efficiency the reactor may be made smaller but still provide the same production output as a larger reactor.

The stream of hydrogen gas discharged from an electrolyser already has a high pressure in case it is generated by a high-pressure electrolyser. Thus, no further compression of the hydrogen gas may be necessary for the reaction with carbon dioxide. The carbon dioxide may however have to be compressed and this is energy consuming.

In view of the above, a general object of the present disclosure is to provide a method of compressing carbon dioxide which solves or at least mitigates the above-mentioned issue.

Another object is to provide a synthetic hydrocarbon gas production system. There is hence according to a first aspect of the present disclosure provided a method of compressing carbon dioxide, $CO_2$, comprising: a) generating a stream of high-pressure oxygen gas and a stream of high-pressure hydrogen gas using a high-pressure electrolyser, b) feeding a reciprocating positive displacement pump comprising a reciprocating member, with a stream of $CO_2$, and with the stream of high-pressure oxygen gas as drive gas to actuate the reciprocating member and compress the $CO_2$ to obtain a stream of high-pressure $CO_2$.

The high-pressure oxygen gas hence finds use for pressurising the $CO_2$. A larger part of the energy generated by the high-pressure electrolyser is hence utilised. No additional external energy is required for compressing the $CO_2$. Thus, a more energy-efficient process is obtained.

The $CO_2$ may be $CO_2$ gas.

One embodiment comprises c) reacting the high-pressure $CO_2$ with the high-pressure hydrogen gas to obtain a synthetic hydrocarbon gas. Synthetic hydrocarbon gas production may hence be made more efficient when using a high-pressure electrolyser.

The synthetic hydrocarbon gas may be methane gas.

One embodiment comprises feeding a second reciprocating positive displacement pump comprising a second reciprocating member, with a stream of water, and the stream of high-pressure oxygen gas as drive gas to actuate the second reciprocating member and compress the water to obtain a stream of compressed water.

According to one embodiment the second reciprocating positive displacement pump is a piston pump or a plunger pump. The second reciprocating member may be a piston or a plunger.

One embodiment comprises feeding the stream of compressed water into the high-pressure electrolyser as electrolyte to generate the stream of high-pressure oxygen gas and the stream of high-pressure hydrogen gas.

Thus, the high-pressure oxygen gas generated by the high-pressure electrolyser may be fed back and used for pressurising the water used as electrolyte. This also ensures that the process becomes more energy efficient.

According to one embodiment high-pressure is a pressure of at least 35 bar. High-pressure may for example be a pressure of at least 50 bar, at least 100 bar, at least 200 bar, at least 300 bar, at least 350 bar, or at least 400 bar.

According to one embodiment the reciprocating positive displacement pump is a piston pump or a plunger pump. The reciprocating member may be a piston or a plunger.

One embodiment comprises generating the stream of $CO_2$ for the feeding in step b) by thermal decomposition of calcium carbonate.

The $CO_2$ for reacting with the high-pressure hydrogen gas may thereby be obtained in an environmentally friendly manner. This may be especially beneficial in large-scale synthetic hydrocarbon gas production.

The thermal decomposition reaction leaves lime, i.e. calcium oxide as a by-product. The calcium oxide can absorb carbon dioxide from the air when in contact with ambient air. This makes the cycle carbon neutral. Hence, by using the present method to produce synthetic hydrocarbon gas or fuel from the synthetic hydrocarbon gas, less carbon dioxide will be produced using the gas/fuel, and by producing lime, it will absorb the same amount of carbon dioxide from the atmosphere if released.

The calcium oxide may be used for cement production or similar industrial applications. In this case, the process of producing the synthetic hydrocarbon gas will become carbon negative. Normally in a cement factory, fossil fuel is used to produce lime from limestone. The fossil fuel as well as the calcination of limestone releases carbon dioxide into the air. Using green lime, the carbon dioxide emission can be reduced from burning fuel as well as from burning limestone. Hence, using the by-product lime, i.e. green lime, there will be a negative carbon footprint.

Alternatively, the by-product lime could be released into the sea to make acidic sea water more alkaline. Hence, the pH value of water will reverse from acidic to alkaline again. This means that sea water can then absorb more carbon dioxide from the air as a natural process while bringing the pH value back to normal, thereby helping the marine environment, especially sea creatures that only thrive in slightly alkaline water.

The calcium carbonate may be contained in limestone.

Limestone absorbs carbon dioxide from the atmosphere very well. 10 kilograms of limestone may form about 9 kilograms of carbon dioxide in a thermal decomposition reaction. Limestone is hence a very good source of carbon dioxide.

There is according to a second aspect of the present disclosure provided a synthetic hydrocarbon gas production system comprising: a high-pressure electrolyser having an oxygen gas outlet and a hydrogen gas outlet, wherein the high-pressure electrolyser is configured to generate a stream of high-pressure oxygen gas discharged through the oxygen gas outlet and a stream of high-pressure hydrogen gas discharged through the hydrogen gas outlet, a reciprocating positive displacement pump comprising: a CO2 inlet configured to receive a stream of CO2, a CO2 outlet, a high-pressure gas inlet connected to the oxygen gas outlet, and a reciprocating member configured to be actuated by the high-pressure oxygen gas as drive gas and compress the CO2 to obtain a stream of high-pressure CO2 discharged through the CO2 outlet.

One embodiment comprises a reactor connected to the CO2 outlet and to the hydrogen gas outlet, wherein the reactor is configured to react the high-pressure CO2 and the high-pressure hydrogen gas to obtain a synthetic hydrocarbon gas.

One embodiment comprises a second reciprocating positive displacement pump including: a water inlet configured to receive a stream of water, a water outlet, a second high-pressure gas inlet connected to the oxygen gas outlet, and a second reciprocating member configured to be actuated by the high-pressure oxygen gas and compress the water to obtain a stream of high-pressure water discharged through the water outlet.

According to one embodiment the high-pressure electrolyser has an electrolyser water inlet, wherein the water outlet is connected to the electrolyser water inlet to feed the high-pressure electrolyser with the high-pressure water as electrolyte.

According to one embodiment high-pressure is a pressure of at least 35 bar.

According to one embodiment the reciprocating positive displacement pump is a piston pump or a plunger pump.

One embodiment comprises a thermal decomposition reaction chamber configured to thermally decompose calcium carbonate, wherein the thermal decomposition reaction chamber comprises a thermal decomposition chamber outlet connected to the CO2 inlet of the reciprocating positive displacement pump. The thermal decomposition reaction chamber is configured to thermally decompose calcium carbonate into CO2 and calcium oxide.

One embodiment comprises a heating device configured to heat the thermal decomposition reaction chamber to a temperature equal to or above a thermal decomposition temperature of calcium carbonate or limestone.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
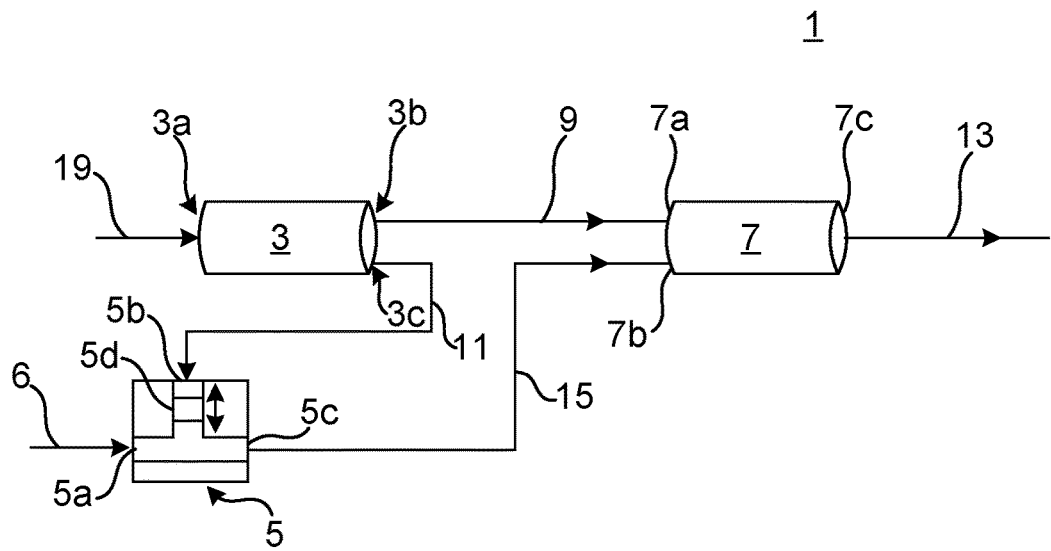
FIG. 1 schematically shows a diagram of an example of a synthetic hydrocarbon gas production system.

FIG. 1 shows an example of a synthetic hydrocarbon gas production system 1-1. The synthetic hydrocarbon gas production system 1-1 comprises a high-pressure electrolyser 3, a reciprocating positive displacement pump 5 and a reactor 7. The high-pressure electrolyser 3 may be an alkaline water high-pressure electrolyser.

The high-pressure electrolyser 3 has an electrolyte inlet 3a, a hydrogen gas outlet 3b and an oxygen gas outlet 3c. The electrolyser 3 may comprise a plurality of electrolytic cells arranged in a stacked configuration. The electrolyte inlet 3a is in fluid communication with the electrolytic cells such that an electrolyte received via the electrolyte inlet 3a can flow into the electrolytic cells. Each electrolytic cell comprising a cathode and an anode for producing a high-pressure hydrogen gas and a high-pressure oxygen gas from the electrolyte. The high-pressure hydrogen gas from all the electrolytic cells is collected inside the high-pressure electrolyser 3 as a stream of high-pressure hydrogen gas. The hydrogen gas outlet 3b is configured to discharge the stream of high-pressure hydrogen gas 9 from the high-pressure electrolyser 3. The high-pressure oxygen gas from all the electrolytic cells is collected inside the high-pressure electrolyser 3 as a stream of high-pressure oxygen gas. The oxygen gas outlet 3c is configured to discharge the stream of high-pressure oxygen gas 11 from the high-pressure electrolyser 3.

The high-pressure electrolyser 3 may comprise a pressure compensator such as the one described in EP3543375 The pressure compensator is configured to equalise pressure differences inside the high-pressure electrolyser 3 created due to the generation of the stream of high-pressure hydrogen gas 9 and the stream of high-pressure oxygen gas 11.

The high-pressure electrolyser 3 may be fed with a stream of high-pressure water 19 as electrolyte. The water may be alkaline water. The high-pressure electrolyser 3 is configured to be connected to an electrolyte source providing a stream of high-pressure water via the electrolyte inlet 3a. In this example, the high-pressure water may for example be generated by means of a pump or a compressor.

The reciprocating positive displacement pump 5 comprises a CO2 inlet 5a, a high-pressure gas inlet 5b and a CO2 outlet 5c. The CO2 inlet 5a is configured to be connected to a CO2 source. The reciprocating positive displacement pump 5 is thereby able to receive a stream of CO2 6. The high-pressure gas inlet 5b is connected to the oxygen gas outlet 3c of the high-pressure electrolyser 3. The reciprocating positive displacement pump 5 is thus configured to receive the stream of high-pressure oxygen gas 11 from the high-pressure electrolyser 3.

The CO2 outlet 5c is connected to the reactor 7. In particular, the reactor 7 has a CO2 reactor inlet 7b and the CO2 outlet 5c is connected to the CO2 reactor inlet 7b.

The reciprocating positive displacement pump 5 comprises a reciprocating member 5d, such as a piston or plunger, configured to reciprocate inside the reciprocating positive displacement pump 5. The stream of high-pressure oxygen gas 11 is configured to act as a drive gas to actuate the reciprocating member 5d to compress the stream of CO2 6 that enters the reciprocating positive displacement pump 5 via the CO2 inlet 5*a*. The CO2 outlet 5*c* is configured to discharge a stream of high-pressure CO2 15 to the reactor 7. To this end, the stream of high-pressure oxygen gas 11 is used for compressing the stream of CO2 6 and obtain the stream of high-pressure CO2 15.

The stream of high-pressure CO2 15 may be a stream of high-pressure CO2 gas.

The reactor 7 has a hydrogen gas inlet 7*a* connected to the hydrogen gas outlet 3*b* of the high-pressure electrolyser 3. The reactor 7 is configured to react the stream of high-pressure CO2 15 with the stream of high-pressure hydrogen 9 to obtain a synthetic hydrocarbon gas 13 such as methane. The reactor 7 has a reactor outlet 7*c* configured to discharge a stream of the synthetic hydrocarbon gas 13.

The reactor 7 may comprise a reactor heater which may comprise an electric heater and/or be configured to utilise waste heat from a power plant or manufacturing plant, so that the high-pressure hydrogen gas 9 is reacted with the high-pressure CO2 15 under high temperature. The reactor heater may be configured to heat the reactor 7 to a temperature of at least 150° C., for example to a temperature in the range 150-250° C., such as a temperature in the range 180-240° C.

The reactor 7 may also comprise a catalyst, such as an iron-oxide based catalyst.

By reacting hydrogen gas and CO2 under high pressure and heat, an efficiency to generate synthetic hydrocarbon gas of about 98% degrees may be attained. Moreover, the production of the synthetic hydrocarbon gas may be made 25-35% more cost efficient, especially in combination with using calcium carbonate as CO2 source.

Figure 2:
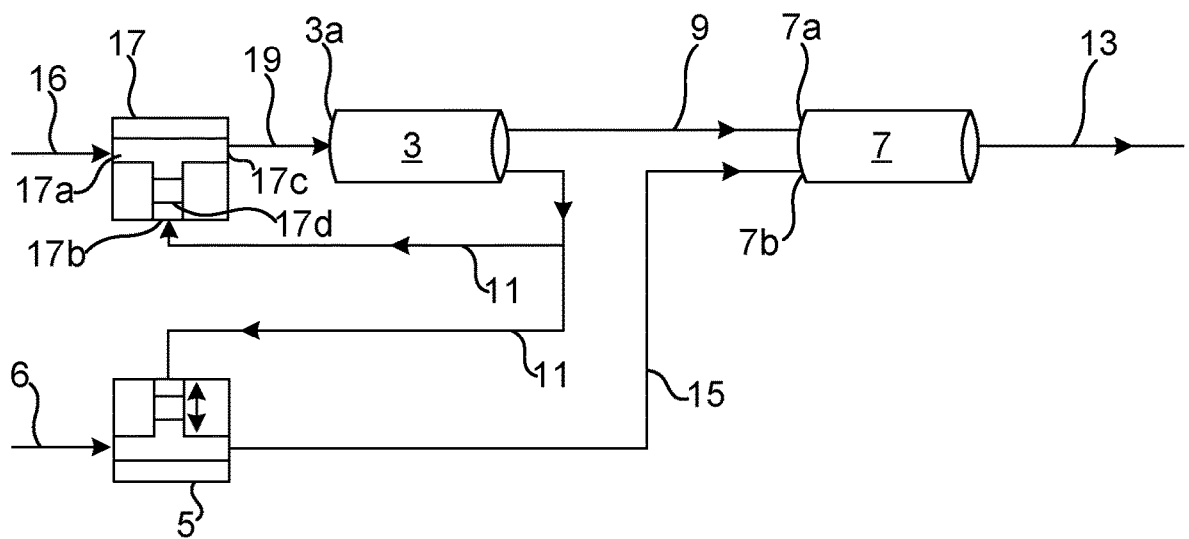
FIG. 2 schematically shows a diagram of another example of a synthetic hydrocarbon gas production system.

FIG. 2 shows another example of a synthetic hydrocarbon gas production system 1-2. The synthetic hydrocarbon gas production system 1-2 is similar to the synthetic hydrocarbon gas production system 1-1. The synthetic hydrocarbon gas production system 1-2 however comprises a second reciprocating positive displacement pump 17. The second reciprocating positive displacement pump 17 comprises a water inlet 17*a*, a second high-pressure gas inlet 17*b* and a water outlet 17*c*.

The second reciprocating positive displacement pump 17 comprises a second reciprocating member 17*d*, such as a piston or plunger, configured to reciprocate inside the second reciprocating positive displacement pump 17.

The stream of high-pressure oxygen gas 11 is configured to act as a drive gas to actuate the second reciprocating member 17*d* to compress the stream of water 16 that enters the second reciprocating positive displacement pump 17 via the water inlet 17*a* to obtain a stream of high-pressure water 19. The water outlet 17*c* is connected to the electrolyte inlet 3*a* of the high-pressure electrolyser 3. The water outlet 17*c* is configured to discharge the stream of high-pressure water 19 to the high-pressure electrolyser 3. The stream of high-pressure oxygen gas 11 is thus used for compressing the stream of water 16 and obtain the stream of high-pressure water 19. In this example, the stream of high-pressure oxygen 11 is used for compressing the stream of water 16, and to compress the stream of CO2 6, as described above.

Figure 3:
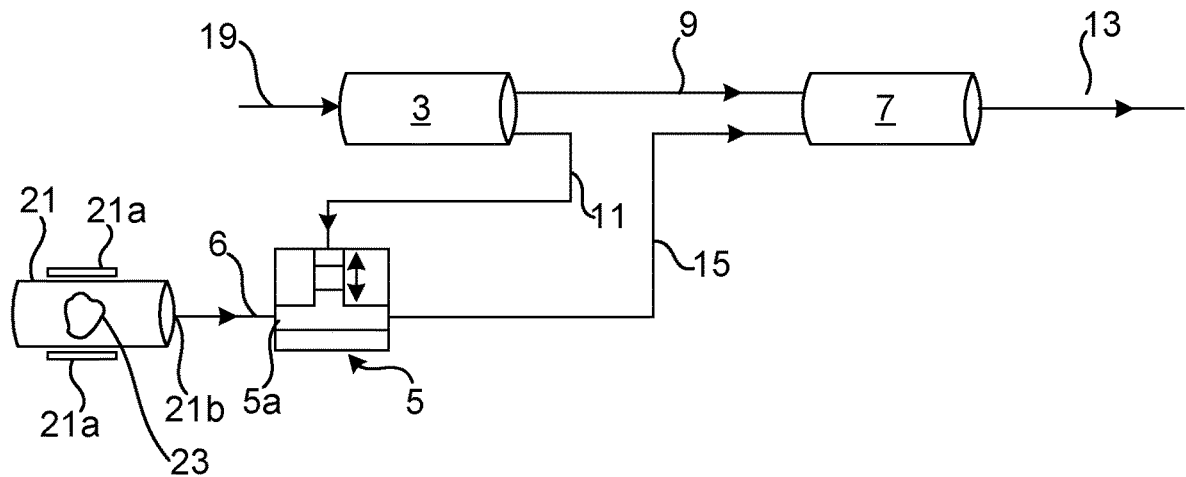
FIG. 3 schematically shows a diagram of another example of a synthetic hydrocarbon gas production system.

FIG. 3 shows another example of a synthetic hydrocarbon gas production system 1-3. The synthetic hydrocarbon gas production system 1-3 could be configured as the synthetic hydrocarbon gas production system 1-1 or the synthetic hydrocarbon gas production system 1-2. The synthetic hydrocarbon gas production system 1-3 however also comprises a thermal decomposition reaction chamber 21. The thermal decomposition reaction chamber 21 may be a vacuum chamber. The thermal decomposition reaction chamber 21 is configured to receive calcium carbonate 23. The calcium carbonate 23 may be contained in limestone. The thermal decomposition reaction chamber 21 may hence be configured to receive limestone.

The synthetic hydrocarbon gas production system 1-3 comprises a heating device 21*a*. The heating device 21*a* is configured to heat the thermal decomposition reaction chamber 21. The heating device 21*a* may be configured to heat the calcium carbonate 23 or limestone arranged inside the thermal decomposition reaction chamber 21 to a temperature equal to or above a thermal decomposition temperature of calcium carbonate 23 or limestone.

The heating device 21*a* may for example be an electrical heating device comprising e.g. electrodes. The synthetic hydrocarbon gas production system 1-3 may comprise one or more renewable energy sources such as solar cells and/or wind turbines and/or wave energy converters configured to power the electrical heating device. The heating device 21*a* could alternatively be a fuel-based heating device.

The thermal decomposition reaction chamber 21 comprises a thermal decomposition reaction chamber outlet 21*b* configured to discharge CO2 generated in the thermal decomposition reaction chamber 21. According to the example, the thermal decomposition reaction chamber outlet 21*b* is connected to the CO2 inlet 5*a*. The stream of CO2 6 is directed from the thermal decomposition reaction chamber 21 to the CO2 inlet 5*a* of the reciprocating positive displacement pump 5. The stream of CO2 6 is compressed by the reciprocating positive displacement pump 5 as described above.

Figure 4:
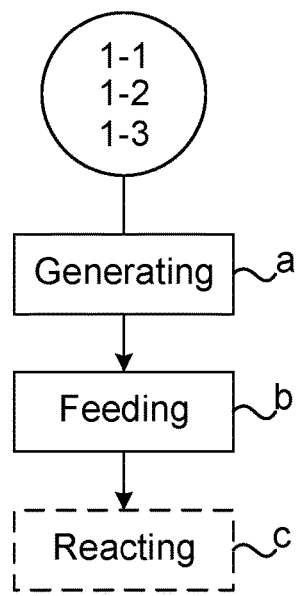
FIG. 4 is a flowchart of a method of compressing CO2.

FIG. 4 shows a method of producing a synthetic hydrocarbon gas by means of the synthetic hydrocarbon gas production system 1-1, 1-2, 1-3.

In case the thermal decomposition reaction chamber 21 is used, the calcium carbonate 23, for example in the form of limestone, is first placed in the thermal decomposition reactor chamber 21. A vacuum or lower pressure than the ambient pressure may then be created in the thermal decomposition reactor chamber 21.

The calcium carbonate 23 is heated to a temperature corresponding at least to a thermal decomposition temperature of calcium carbonate. This temperature may be above 600° C., such as above 800° C., for example at least 840° C. The calcium carbonate 23 in the thermal decomposition reactor chamber 21 thereby releases CO2 in a thermal decomposition reaction or calcination. Calcium oxide or quicklime is formed inside the thermal decomposition reactor chamber 21 as a by-product of the thermal decomposition reaction.

The CO2 formed in the thermal decomposition reaction is discharged from or exits the thermal decomposition reactor chamber 21 through the thermal decomposition reaction chamber outlet 21*b* and flows into the reciprocating positive displacement pump 5.

When all the calcium carbonate 23 has been reacted in the thermal decomposition reaction, about 90% of the calcium carbonate 23 has turned to carbon dioxide and the rest has turned into solid calcium oxide. The by-product calcium oxide is at this point arranged in the thermal decomposition reaction chamber 21 and can be removed when all the calcium carbonate 23 has been reacted. The calcium oxide may for example be used to manufacture cement or released into the sea to counteract acidity of the sea. Hereto both the carbon dioxide and the only by-product calcium oxide may be fully utilised.

In case another CO2 source is used than the above-described thermal decomposition reaction chamber 21 and calcium carbonate 23, the stream of CO2 6 flows from the CO2 source into the reciprocating positive displacement pump 5 via the CO2 inlet 5a.

In a step a) the stream of high-pressure oxygen gas 11 and the stream of high-pressure hydrogen gas 9 are generated by the high-pressure electrolyser 3. The stream of high-pressure oxygen gas 11 and the stream of high-pressure hydrogen 9 are generated by electrolysis of the stream of high-pressure water 19 entering the high-pressure electrolyser 3 via the electrolyte inlet 3a.

In a step b) the stream of high-pressure oxygen gas 11 is fed to the reciprocating positive displacement pump 5. The stream of high-pressure oxygen 11 is fed to the high-pressure gas inlet 5b of the reciprocating positive displacement pump 5. The stream of CO2 6 is also fed to the reciprocating positive displacement pump 5. The high-pressure oxygen gas 11 is used as drive gas to actuate the reciprocating member 5d. The CO2 6 in the reciprocating positive displacement pump 5 is thus compressed by and discharged from the reciprocating positive displacement pump 5.

The stream of high-pressure hydrogen gas 9 is fed to the reactor 7.

In a step c) the high-pressure CO2 15 is reacted with the high-pressure hydrogen gas 9 in the reactor 7. A synthetic hydrocarbon gas 13 is thus obtained from this reaction.

Step c) may involve reacting the high-pressure CO2 with the high-pressure hydrogen gas 9 at a temperature of at least 150° C., such as at a temperature in the range 150-250° C., or a temperature in the range 180-240° C.

The synthetic hydrocarbon gas 13, i.e. methane gas, may be used as is or it may for example be processed to obtain liquid fuel such as methanol, diesel or petrol.

In examples utilising the synthetic hydrocarbon gas production system 1-3, the high-pressure oxygen gas 11 is also fed back to the second reciprocating positive displacement pump 17 for compressing the stream of water 16 to obtain the stream of high-pressure water 19.

As an alternative to using the high-pressure oxygen gas as drive gas, falling outside the scope of the claims, any other high-pressure gas, such as high-pressure air, may be used for actuating the reciprocating member of the reciprocating positive displacement pump and/or the second reciprocating positive displacement pump.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of compressing carbon dioxide, CO2, comprising:
   a) generating a stream of high-pressure oxygen gas and a stream of high-pressure hydrogen gas using a high-pressure electrolyser,
   b) feeding a reciprocating positive displacement pump including a reciprocating member, with a stream of CO2, and with the stream of high-pressure oxygen gas as drive gas to actuate the reciprocating member and compress the CO2 to obtain a stream of high-pressure CO2.

2. The method as claimed in claim 1, comprising c) reacting the high-pressure CO2 with the high-pressure hydrogen gas to obtain a synthetic hydrocarbon gas.

3. The method as claimed in claim 1, comprising feeding a second reciprocating positive displacement pump including a second reciprocating member, with a stream of water, and the stream of high-pressure oxygen gas as drive gas to actuate the second reciprocating member and compress the water to obtain a stream of compressed water.

4. The method as claimed in claim 3, wherein the second reciprocating positive displacement pump is a piston pump or a plunger pump.

5. The method as claimed in claim 3, comprising feeding the stream of compressed water into the high-pressure electrolyser as electrolyte to generate the stream of high-pressure oxygen gas and the stream of high-pressure hydrogen gas.

6. The method as claimed in claim 1, wherein high-pressure is a pressure of at least 35 bar.

7. The method as claimed in claim 1, wherein the reciprocating positive displacement pump is a piston pump or a plunger pump.

8. The method as claimed in claim 1, comprising generating the stream of CO2 for the feeding in step b) by thermal decomposition of calcium carbonate.

9. A synthetic hydrocarbon gas production system comprising:
   a high-pressure electrolyser having an oxygen gas outlet and a hydrogen gas outlet, wherein the high-pressure electrolyser is configured to generate a stream of high-pressure oxygen gas discharged through the oxygen gas outlet and a stream of high-pressure hydrogen gas discharged through the hydrogen gas outlet,
   a reciprocating positive displacement pump comprising:
   a CO2 inlet configured to receive a stream of CO2,
   a CO2 outlet,
   a high-pressure gas inlet connected to the oxygen gas outlet, and
   a reciprocating member configured to be actuated by the high-pressure oxygen gas as drive gas and compress the CO2 to obtain a stream of high-pressure CO2 discharged through the CO2 outlet.

10. The synthetic hydrocarbon gas production system as claimed in claim 9, comprising a reactor connected to the CO2 outlet and to the hydrogen gas outlet, wherein the reactor is configured to react the high-pressure CO2 and the high-pressure hydrogen gas to obtain a synthetic hydrocarbon gas.

11. The synthetic hydrocarbon gas production system as claimed in claim 9, comprising a second reciprocating positive displacement pump including:
   a water inlet configured to receive a stream of water,
   a water outlet,
   a second high-pressure gas inlet connected to the oxygen gas outlet, and
   a second reciprocating member configured to be actuated by the high-pressure oxygen gas and compress the water to obtain a stream of high-pressure water discharged through the water outlet.

12. The synthetic hydrocarbon gas production system as claimed in claim 11, wherein the high-pressure electrolyser has an electrolyte inlet, wherein the water outlet is connected to the electrolyte inlet to feed the high-pressure electrolyser with the high-pressure water as electrolyte.

13. The synthetic hydrocarbon gas production system as claimed in claim 9, wherein high-pressure is a pressure of at least 35 bar.

14. The synthetic hydrocarbon gas production system as claimed in claim 9, wherein the reciprocating positive displacement pump is a piston pump or a plunger pump.

15. The synthetic hydrocarbon gas production system as claimed in claim 9, comprising a thermal decomposition reaction chamber configured to thermally decompose calcium carbonate, wherein the thermal decomposition reaction chamber includes a thermal decomposition reaction chamber outlet connected to the CO2 inlet of the reciprocating positive displacement pump.

\* \* \* \* \*